Dec. 6, 1938.   F. W. DOUTHITT   2,138,908

EAR CORN STEAMER

Filed June 14, 1937   2 Sheets-Sheet 2

INVENTOR
Frank W. Douthitt
By his Attorneys
Merchant & Kilgore

Patented Dec. 6, 1938

2,138,908

UNITED STATES PATENT OFFICE 2,138,908

EAR CORN STEAMER

Frank W. Douthitt, Ortonville, Minn.

Application June 14, 1937, Serial No. 148,121

6 Claims. (Cl. 53—2)

My invention provides a simple and highly efficient steamer or vapor cooker especially adapted for use in generating steam in an enclosed casing, to heat to the desired eating temperature ear corn or corn on the cob that has been previously cooked, and adapted also for cooking by steam ear corns that have been previously cooked.

In my pending application "Machine for preparing corn for canning on the cob", S. N. 113,397, I have disclosed and claimed a machine for axially boring a hole through the center of the corn ears that are to be canned. It is usually the custom to process, that is, cook to a greater or less extent these bored out corn ears after they have been sealed in the can.

The present device is especially adapted for use in heating these canned ears at the time that they are to be eaten; and this device is, therefore, made of such size and is of such character that it is adapted to be placed on a table and used to heat the corn ears just before they are to be eaten. The device, nevertheless, can be used to completely cook, by steaming process, the ears that have not been cooked previously and regardless of whether or not they have been axially bored out.

A commercial form of the improved steamer is illustrated in the accompanying drawings, wherein like characters indicate like parts throughout the several views.

Referring to the drawings.

Figure 1:
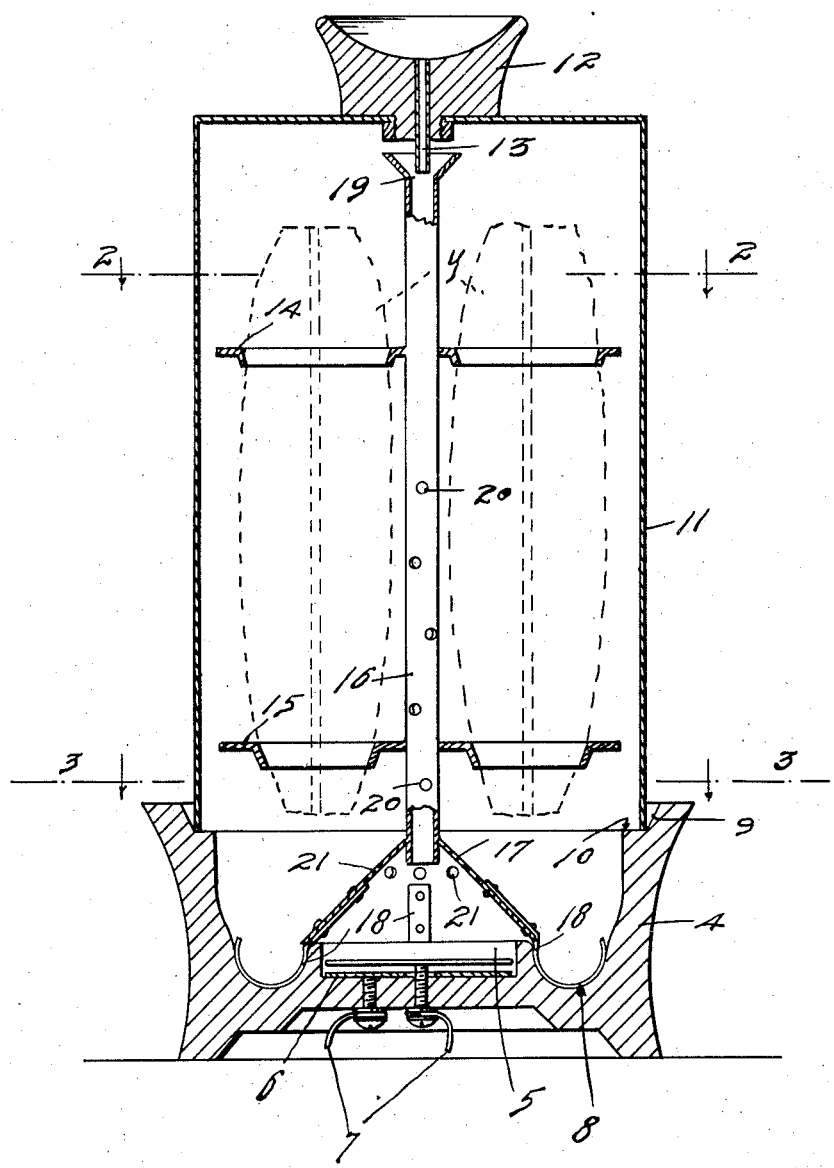
Fig. 1 is a view chiefly in vertical axial section showing the improved steamer, some parts thereof being in full elevation.
Figure 2:
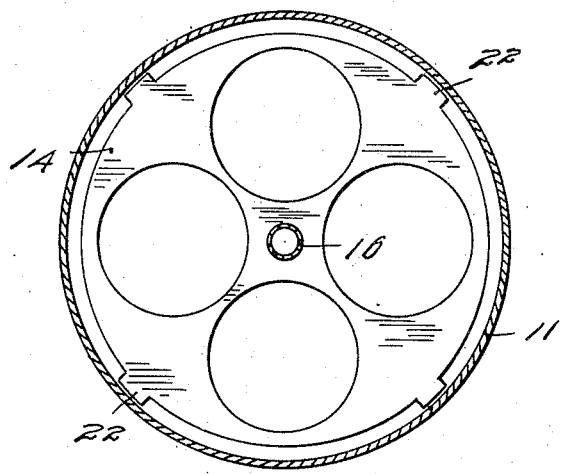
Fig. 2 is a horizontal section taken on the line 2—2 of Fig. 1.
Figure 3:
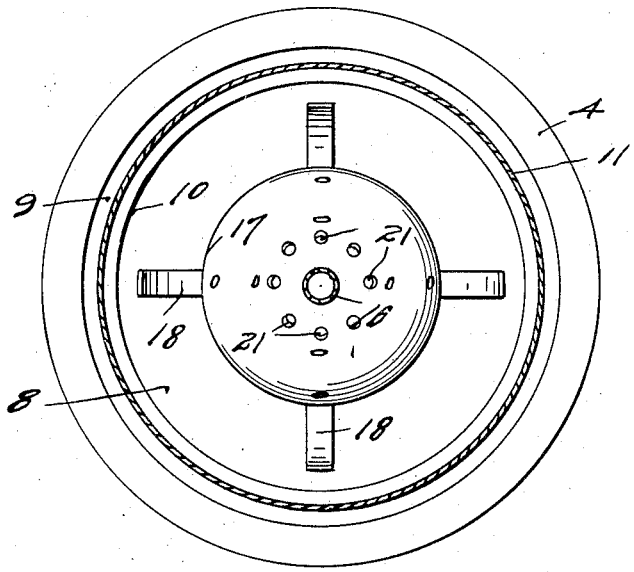
Fig. 3 is a horizontal section taken on the line 3—3 of Fig. 1.

The base 4 of the device may be of any suitable material but is preferably of baked earthenware or similar material that is a non-conductor of electricity and at least a low conductor of heat. This base 4 is formed at its bottom with an axially located water-containing cup or receptacle 5, in which is located an electrical heating element 6 that receives current through suitable leads 7. Surrounding the rim of the cup 5 the base is formed with an annular juice-receiving trough or channel 8. The rim of the base 4 is formed with an upstanding flange 9 and inward thereof with a rest shoulder 10.

The numeral 11 indicates an inverted cup-shaped casing that is made cylindrical to fit the round rim of the base and to rest on the flat annular surface 10 just inward of the upstanding flange or rib 9, whereby the casing is held against lateral displacement. As indicated in the preferred form of the device, the base is made round and the casing cylindrical.

Secured to the top of the casing 11 is a drip cup 12 which has a small annular water drip passage leading to a small depending drip tube 13 that extends through the top of the casing.

The corn cobs marked $y$ in Fig. 1 are indicated by dotted lines. The device shown is adapted to hold four ears of corn in an upright position but might be designed to hold a greater or less number of ears. The holder shown comprises upper and lower disc-like plates 14 and 15 that are rigidly connected to and supported by an axially located upright tube 16. At its lower end the tube 16 is secured to a hood 17, which, as shown, is of conical form and is provided with a plurality of circumferentially spaced downwardly and outwardly extended U-shaped supporting legs 18 that fit within the drip trough 8 of the base and hold the tube 16 in an upright position. Here it will be noted that the hood 17 extends outward far enough to direct drippings into the trough 8.

The upper end of the tube 16 is positioned to receive water dripping from the cup 12 and, hence, is preferably made funnel-shaped at 19 to loosely receive the lower end of the drip tube 13. The tube 16 has longitudinally spaced vapor discharge passages 20, and the hood 17 adjacent to the lower end of said tube is preferably formed with vapor escape passages 21. Preferably, the holder plates 14 and 15 are provided with circumferentially spaced outstanding lugs 22 that loosely engage the interior of the casing and hold the tube 16 against lateral tilting movements when the casing is applied. When the casing is removed, the tube 16, together with the holder plates 14 and 15 and the hood 17 with its supporting legs 18, may be freely removed from the base for the purpose of cleaning or for other reason.

The tube 16 affords a stem for spacing and supporting the ear holding plates 14 and 15, and which latter, as will be noted, are provided with circumferentially spaced perforations large enough in the upper plate 14 to permit ears to be freely passed therethrough but large enough in the lower plate 15 to permit the smaller ends of corn ears to pass therethrough.

When the device is to be used for cooking uncooked ears or for warming up previously cooked ears, water will be placed in the drip cup 12 and allowed to run down through the tube 16 onto the heating element 6, which is within the cup 5. The extent of the cooking or heating will depend upon the amount of water that is delivered into the cup 5 and onto the heating element 6. Usually the amount of water will just about cover the electrical heating element but will not come into contact with the ends of the ears. When the passage from the drip cup is very small, the flow will be such that the steam will be generated chiefly by flash action as it drips into the electrical heater. A little experience will inform the user as to just about how much water is to be placed in the drip cup and thereafter generated into steam in order to produce a certain heating or cooking action. Of course, the heating of the corn ears will be more rapid when the ears have been bored out, so that the steam may pass through the interior of the cup as well as around the exterior of the kernels. As is evident, the steam will escape through the passages 20 and 21 and will come into contact with the entire exterior surface of the corn ears, so that the cooking or heating action will be even and, when continued for the proper time, will produce the proper heating or cooking action. It is a well known fact that corn ears cooked by steam will better retain their flavor than ears that are boiled in water.

In actual practice this device has been found efficient for the purposes had in view. A preferred form of the device is shown, but it will be understood that modifications may be made within the scope of the invention herein disclosed and claimed.

What I claim is:

1. In a steamer of the kind described, a base formed at its bottom with an axial water receptacle and a surrounding drip trough, a heat supplying element in said water receptacle, a hood covering said water receptacle, a tubular stem extended upward from said hood, means on said stem for holding ears of corn, an inverted cup-shaped casing seated on said base, and a drip cup on the top of said casing having a conduit arranged to deliver into the upper end of said tubular stem.

2. The structure defined in claim 1 in which said tubular stem has vapor discharge perforations.

3. The structure defined in claim 1 in which said hood, stem and corn holding plates are rigidly connected but removable from said base.

4. The structure defined in claim 1 in which said hood is provided with circumferentially spaced outwardly and downwardly extended legs detachably seated in said drip trough.

5. The structure defined in claim 1 in which said hood is provided with circumferentially spaced outwardly and downwardly extended legs detachably seated in said drip trough, said hood being extended over said water receptacle for directing drippings into said trough, said tubular stem having vapor discharge passages and said hood adjacent to the lower end of said tubular stem having vapor discharge passages.

6. The structure defined in claim 1 in which said drip cup has a depending tube loosely telescoped into the said tubular stem.

FRANK W. DOUTHITT.